United States Patent

Hunter et al.

[11] Patent Number: 6,157,113
[45] Date of Patent: Dec. 5, 2000

[54] CONDUCTING POLYMER GENERATOR-ACTUATOR WITH ENERGY STORAGE/RECOVERY

[75] Inventors: Ian W. Hunter; Serge R. Lafontaine, both of Lincoln; John D. Madden, Somerville, all of Mass.

[73] Assignee: Massachusetts Institute of Technology, Cambridge, Mass.

[21] Appl. No.: 09/263,980

[22] Filed: Mar. 5, 1999

Related U.S. Application Data

[60] Provisional application No. 60/077,063, Mar. 6, 1998.

[51] Int. Cl.[7] .................................... H02K 57/00
[52] U.S. Cl. ............................................ 310/300
[58] Field of Search .................................. 310/273, 300, 310/12, 13, 14

[56] References Cited

PUBLICATIONS

Takashima et al Mechanochemoelectrical Effect of Polyaniline Film, Synthetic Metals, 85, 1395, 1997 Month Unknown.

*Primary Examiner*—Nestor Ramirez
*Assistant Examiner*—Judson H. Jones
*Attorney, Agent, or Firm*—Bromberg & Sunstein LLP

[57] ABSTRACT

A method for generating electricity is provided utilizing a conducting polymer, an electrolyte and a counterelectrode and applying mechanical work to the polymer thereby generating an electrical potential between the conducting polymer and the counterelectrode. Coupling of the electrical potential is then made to an external circuit. The resultant mechanical to electrical energy conversion efficiency is at least 0.01%. Also provided is a method for braking a mechanical member by utilizing a conducting polymer, coupling it to the mechanical member, generating an electrical potential between the conducting polymer and a counterelectrode and coupling the electrical potential to an external circuit. The step of coupling may include dissipating and/or storing electrical energy in the external circuit. The conducting polymer provided may preferably be polypyrrole. In another embodiment, a brake for the mechanical member is provided.

25 Claims, 2 Drawing Sheets

CONDUCTING POLYMER GENERATOR-ACTUATOR WITH ENERGY STORAGE/RECOVERY

RELATED U.S. APPLICATION

The present application claims priority from Provisional Application Serial No. 60/077,063, filed Mar. 6, 1998, which is hereby incorporated herein by reference.

TECHNICAL FIELD

The present invention pertains to a method for efficiently converting mechanical energy to electrical energy using a conducting polymer, and further to an apparatus and method for regeneratively braking a moving mechanical member.

BACKGROUND ART

The application of conducting polymer actuators to the propulsion of vehicles is taught in U.S. patent application Ser. No. 09/130,500, filed Aug. 7, 1998, which is attached hereto and incorporated herein by reference. Conducting polymer actuators are attractive because they have the potential to overcome the low torque to mass ratio and the efficiency limitations of current propulsion technologies.

In many applications, actuators impart kinetic energy to devices. In automobiles, for example, combustion engines are employed to develop tremendous kinetic energy (typically, kinetic energy on the order of 400 kJ). This energy is not recovered and, particularly for "stop and go" city driving, reduces vehicle fuel efficiency. The ability to reuse developed kinetic energy is an important consideration in choosing the next generation of automobile motor. Furthermore, the harnessing of power from, for example, water, wind, and human motion all involve the conversion of mechanical power into other forms of energy for more convenient storage and delivery. Typically, electrical generators are used in such applications.

In many electric vehicles, the same motor that develops the torque used in acceleration is also responsible for braking. During braking of these vehicles, electrical power is regenerated and batteries recharged. A major disadvantage of these electric vehicle motors, when considering both vehicle acceleration and power regeneration, is their low power to mass ratio for direct drive motors (<0.2 kW/kg). Combustion engines, by comparison, produce 1 kW/kg, so that, although they are incapable of performing regeneration, they remain the motors of choice. Conducting polymer actuators offer the potential of power to mass ratios of 200 kW/kg.

Conducting polymers feature a conjugated carbon backbone. Some common conducting polymers are polyaniline, polypyrrole and polyacetylene. These materials are normally semiconductors. Without being bound to any particular theory, the conductivity of the conducting polymers may be changed by oxidation or reduction. It is theorized that the oxidation or reduction leads to an electric charge imbalance which, in turn, results in a flow of ions into the polymer material in order to restore balanced charge. Such ions or dopants may enter the polymer from a surrounding, ionically conductive, medium. The medium may be a gel, a solid electrolyte or a liquid electrolyte. If ions are already present in the polymer when it is oxidized or reduced, they may also exit the polymer. Such mass transfer of ions both into and out of the material leads to a contraction or expansion of the polymer. In some conducting polymers, the expansion is due to ion insertion between polymer chains; in others, inter-chain repulsion is the dominant effect. Additionally, conformational and bond length changes may also result in macroscopic expansion and contraction. Typical volume changes are on the order of 10%, and linear dimensional changes are hence on the order of 3%. Stresses have been observed in conducting polymer materials which are on the order of 20 Mpa, while bandwidths of 10 kHz are anticipated in conducting polymer actuators, although those observed to date are limited to 60 Hz.

Takashima et al. in *Mechanochemoelectrical effect of polyaniline film*, Synthetic Metals, 85, 1395 (1997) were the first to publish results demonstrating the use of conducting polymers in converting mechanical energy into electrical energy. They describe the generation of a current in response to deformation of a strip of polyaniline and attribute the current generated to a mechanically induced electrochemical reaction. The mechanical to electrical energy conversion efficiency is reported to be much less than 0.01%.

SUMMARY OF THE INVENTION

A first embodiment of the present invention provides a method for generating electricity, including the first step of providing a conducting polymer having a surface, an electrolyte coupled to the surface of the conducting polymer at an interface and a counterelectrode immersed in the electrolyte. Mechanical work is then applied to the conducting polymer so as to generate an electrical potential between the conducting polymer and the counterelectrode. Then, coupling of the electrical potential is made to an external circuit. The resultant mechanical to electrical energy conversion efficiency is at least 0.01%. The conducting polymer, in accordance with a preferred embodiment, may be polypyrrole.

Another embodiment of the present invention provides a method for braking a mechanical member which has kinetic energy including the first step of providing a conducting polymer having a surface, an electrolyte coupled to the surface of the conducting polymer at an interface and a counterelectrode immersed in the electrolyte. Next, the mechanical member is coupled to the conducting polymer such as to apply mechanical work to the conducting polymer. Subsequent steps include generating an electrical potential between the conducting polymer and the counterelectrode and coupling the electrical potential to an external circuit. The resultant mechanical to electrical energy conversion efficiency may be at least 0.01%. The step of coupling may include dissipating and/or storing electrical energy in the external circuit. The conducting polymer provided may be polypyrrole while the electrolyte provided may be an aqueous or propylene carbonate containing solution of a salt chosen from the group consisting of tetraalkylammonium hexafluorophosphate and sodium dodecylbenzene sulfonate. The conducting polymer may be a sheet and, further, may be essentially circular.

In another embodiment, a brake for a mechanical member having kinetic energy is provided. The brake includes a sheet of anisotropic conducting polymer having a specified point and a periphery. The specified point is coupled to a crank and the periphery is coupled to a stator. The brake also includes a coupling assembly for coupling the motion of the mechanical member to the crank and, further, includes a controller for extracting electrical energy from portions of the sheet in temporal phase. In operation, a radius vector directed between the specified point and the center of the crank executes a polar rotation about the specified point. The sheet may be essentially circular and may be polypyrrole. The electrical energy may be generated by sequential contraction and expansion of the sheet portions. The controller may further include an electrolyte and a counterelectrode.

In yet another embodiment of the present invention, a brake for a mechanical member having kinetic energy is provided having at least one conducting polymer member with two ends The first end is coupled to a crank while the second end is coupled to a stator. The brake also has a coupling assembly for coupling the motion of the mechanical member to the crank and has a controller for extracting electrical energy from the at least one member. In operation, a radius vector directed between the first end and the center of the crank executes a polar rotation about a specified point fixed with respect to the stator.

DETAILED DESCRIPTION OF SPECIFIC EMBODIMENTS

Conversion, analogous to use of an electric generator, of mechanical to electrical energy has been observed in conducting polymers. Generator efficiency is defined for the purposes of the present invention as the ratio of the electrical energy output from the generator to the mechanical energy input to the generator. This may be expressed in terms of the output electrical potential, V, charge q, and the input force, F, as well as the resulting displacement, r by the following:

$$\text{CONVERSION EFFICIENCY} = \frac{\int V dq}{\int F \cdot dr}$$

The generation of an electric current in response to the mechanical deformation of a strip of polyaniline has been reported and is attributed to mechanically induced oxidation/reduction of the polyaniline. (Takashima et al.) The generator efficiency was reported to be much less than 0.01%.

Not being bound to a particular theory, the inventors have discovered that, in some polymers, notably polypyrrole, capacitive charging of the polymer also leads to expansion, contraction, and the production of strain in the material. Surprisingly, the inventors have determined that polypyrrole is at least 10 times more efficient that polyaniline as an electrical generator. The improved efficiency is likely related to a difference in mechanism. It is postulated that the application of force or mechanical work to polypyrrole film results in a change in the capacitance, thereby generating a larger current or electrical energy than has been seen with polyaniline.

Figure 1:
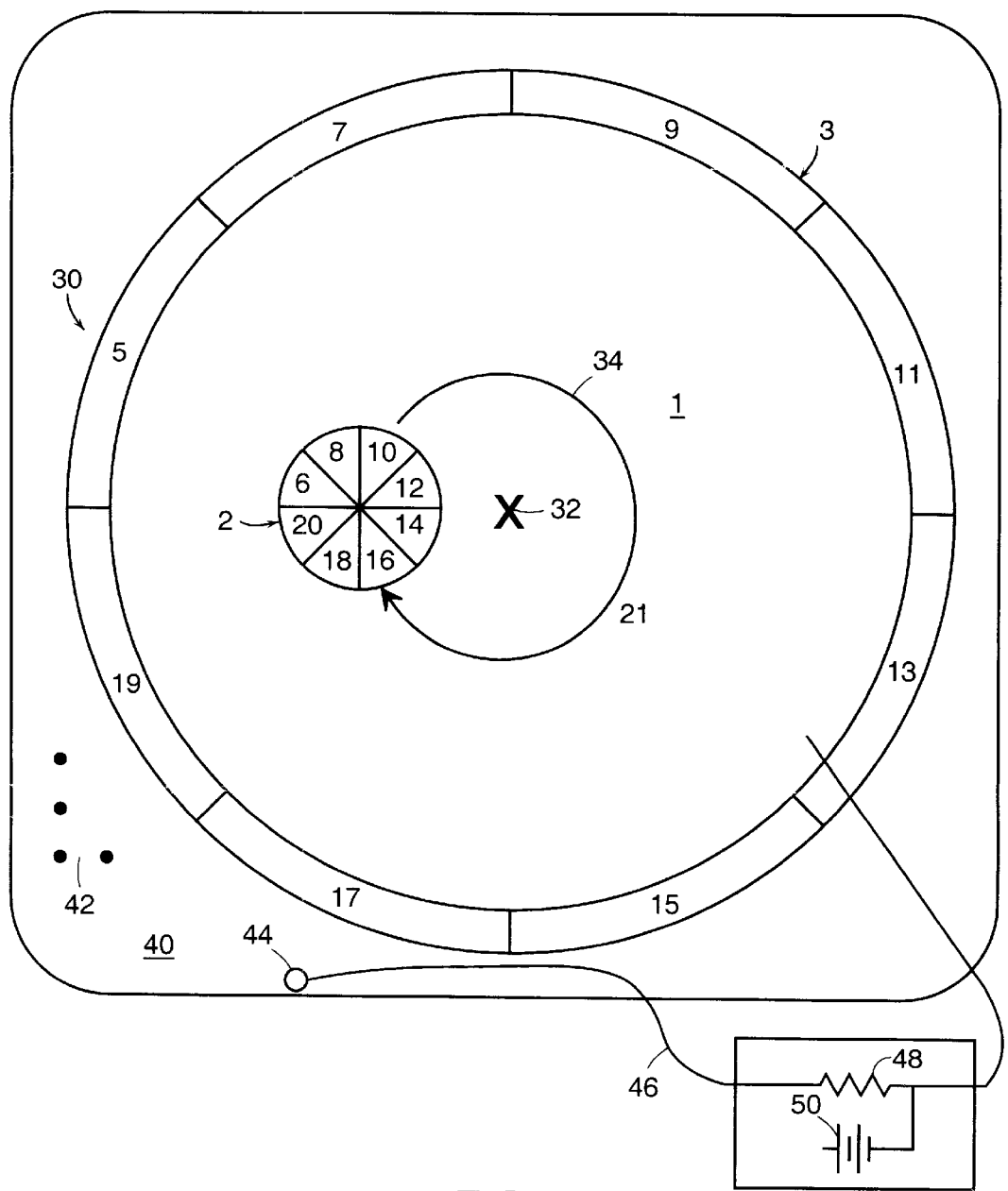
FIG. 1 is a schematic view from the top of a rotary generator-actuator comprised of a conducting polymer sheet, a crank and an outer member, the actuator being employed as a brake in accordance with an embodiment of the invention.

Referring now to FIG. 1, an embodiment of a rotary generator-actuator is shown, designated generally by the numeral 30. A polymer sheet 1 is stretched between a crank 2 and an annulus 3. Annulus 3 constitutes the outer member of actuator 30. Polymer sheet 1 may be processed, as is known to persons skilled in the art of polymer engineering, so that the electrical conductivity of sheet 1 is anisotropic. A particular process is described below. For example, the electrical conductivity of sheet 1 may be caused to be higher when measured in a radial direction. By radial direction or radial vector is meant the direction between center 32 of the sheet and the periphery of sheet 1 adjacent to annulus 3). Polymer film 1 is preferably polypyrrole, although other conducting polymers, such as polyphenylene, polythiophene, polyacetylene, and their no derivatives, may be used. For illustrative purposes, polymer sheet 1 is shown to be disk shaped, however other planar or even three-dimensional shapes may be used in accordance with various embodiments of the invention and are within the scope of the appended claims. For improved performance, it is known that the surface area of the sheet per volume should be maximized.

The polypyrrole active layer is galvanostatically polymerized on a glassy carbon substrate from mixture of 0.06 M freshly distilled pyrrole monomer and 0.05 M tetraethylammonium hexafluorophosphate in propylene carbonate. Deposition takes place at −30° C. in a nitrogen atmosphere at a current density of 1.25 $Am^{-2}$, following methods of Yamaura et al., *Memory effect of electrical conductivity upon the counter-anion exchange of polypyrrole films*, Synthetic Metals, 48, 337 (1992), which is incorporated herein by reference. Film dimensions are, typically, 35 mm long×6 mm wide×40 to 100 microns thick. The resulting material has a density of about 1400 kg $m^{-3}$, an electrical conductivity in the range of 10–300 S $cm^{-1}$, a glassy modulus of 0.5 GPa and 2.0 GPa, and a tensile strength of greater than 25 MPa. When stretch aligned the conductivity may be increased to the order of 1000 S $cm^{-1}$ along the stretch direction, producing anisotropic conductivity. (S is for Siemens, also known as mhos or inverse ohms).The resulting films are both mechanically robust and highly conductive. The high conductivity helps maximize efficiency by minimizing dissipation losses.

Numerals 5, 7, 9 ,11 13 ,15 ,17, and 19 designate sections of outer member 3. Numerals 6, 8, 10, 12, 14, 16, 18, and 20 designate sections of crank 2. Each of the section 5–20 are electrical contacts to polymer sheet 1. In an embodiment of the invention, the entire rotary generator-actuator 30 is immersed in an electrolyte 40 containing ions 42 that will enter or exit polymer sheet 1 and result in the expansion or contraction. Electrolyte 40 may be a fluid or a gel. The amount of charge transferred upon mechanical deformation is proportional to the applied strain and may reach 5×10$^9$ Coul $m^{-3}$. The potential produced is a function of the rate of strain and the magnitudes of internal and external impedances. The higher the strain rate and impedances, the larger the potential. The relative placement of the polymer sheet 1 and the counterelectrode 44, as well as the ionic concentration and mobility, should be designed such that the electrolyte resistance is negligible compared to that of the external circuit, thereby minimizing dissipative losses.

The electrolyte may also, as an alternative to aqueous solution, be either ionically conducting materials (such as Nafion, produced by E.I. du Pont de Nemours and Co.,Inc.) or gels such as agar or PMMA-based gel. With polypyrrole, the use of aqueous or propylene carbonate solutions of various ions such as tetraethylammonium hexaflurophosphate, sodium dodecylbenzeneusulfonate, or other salts or acids, is preferred; these salts and acids may also be used with gels and ionically conductive polymers, as described above. A counterelectrode 44 is present in electrolyte 40, against which all other potentials are generated. As the crank 2 follows path 34 in the direction of arrow 21, segments of the sheet 1 are alternately expanded and contracted. As mechanical work is alternately added and removed, each segment of sheet 1 charges and discharges. Electrical energy, in the form of current flow results with the external circuit 46 completing a path through counterelectrode 44 and electrolyte 40. Such mechanoelectrical conversion is a matter readily apparent to persons of ordinary skill in the mechanical arts.

A change in ion concentration will occur across the boundary of the conducting polymer sheet 1 into electrolyte 40. Changing the ionic balance across this boundary causes an electrical potential to be created. This, in turn, causes current to flow via external circuit 46. The relative placement of the polymer sheet 1 and counterelectrode 44, as well as the ionic concentration and nature should be designed with impedance reduction in mind in order to increase mechanical to electrical energy efficiency. In accordance with another embodiment of the present invention, the braking of a moving mechanical part (such as the wheel of a vehicle or other machinery) may be accomplished by harnessing electrical energy induced in an analogous external circuit 46. The current flows because of the electrical potential generated across the boundary between the strained conducting polymer and the electrolyte. In the brake designs illustrated in FIGS. 1 and 2, outer member 3 is coupled to a stationary member (or stator). In the figures, a specified point 32 either, in the embodiment of FIG. 1, on the sheet 1 or, in the embodiment of FIG. 2, on the stator serves as a focus about which a radius vector directed between specified point 32 and the center of crank 2 executes a polar rotation about point 32. The generated electrical energy may be used to charge an electrical battery 50, or in any other manner known in the art for either storing or dissipating energy. A dissipating element is represented by resistive element 48. If the energy is stored, it may subsequently be used for the production of further mechanical propulsion, thereby further increasing the efficiency of a vehicle. Polypyrrole, which exhibits an order of magnitude higher generator efficiency than other conducting polymers (e.g. polyaniline) is well suited as a material for use in the brake.

Figure 2:
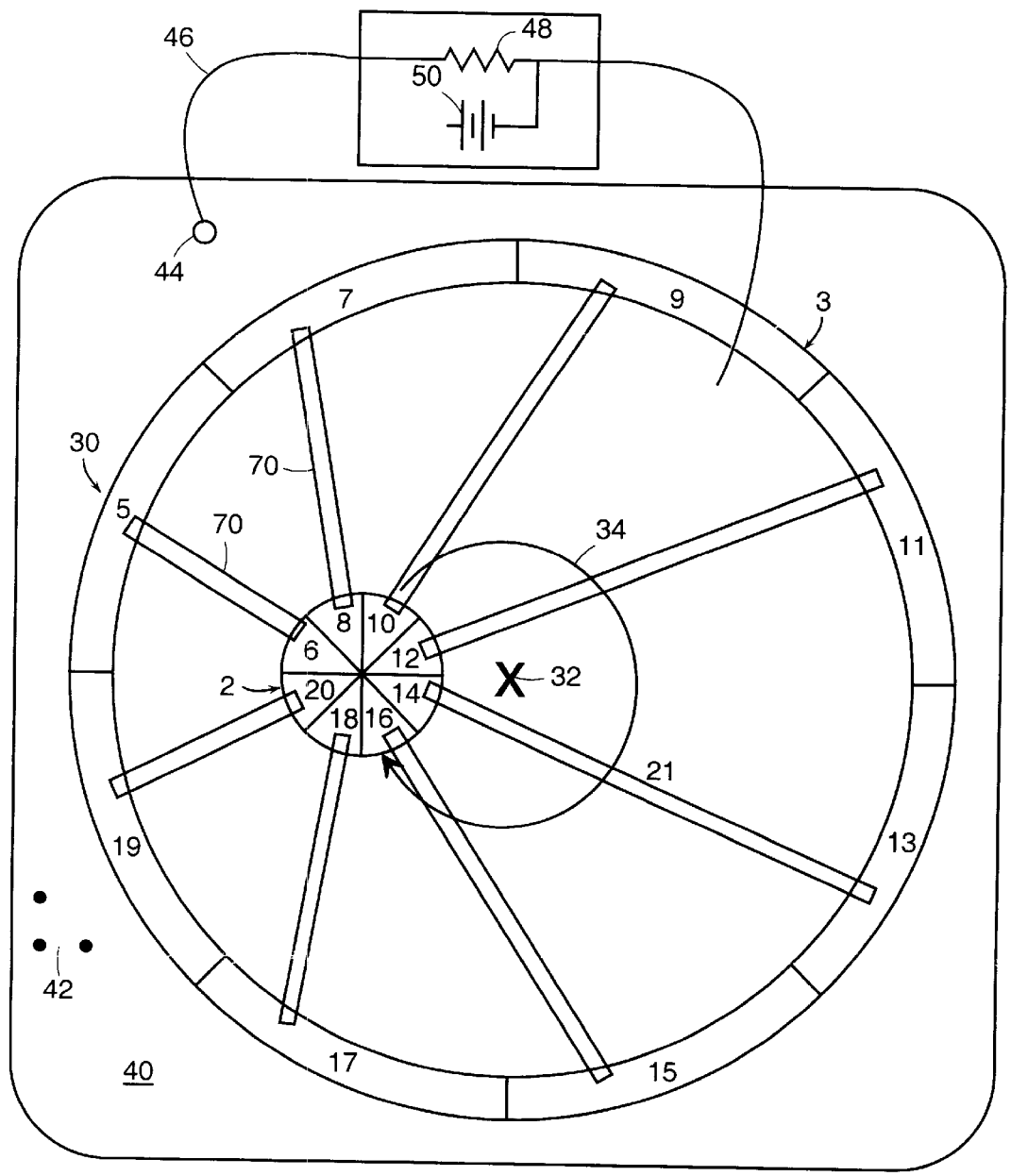
FIG. 2 is a schematic view from the top of a rotary generator-actuator comprised of a plurality of conducting polymer members, a crank and a stator, the actuator being employed as a brake in accordance with another embodiment of the invention.

The embodiment shown in FIG. 2 includes fiber or tape polymer elements 70 instead of a sheet 1. The rotary generator-actuator of FIG. 2 features one or more such elements. Focus 32 about which polar rotation is taking place may be fixed relative to the stator when the generator-actuator 30 is used as a brake. An element 70 situated between section 5 and 6 is contracted causing generation of electrical energy which may be dissipated or stored. Other elements 70 are shown in various states of contraction and expansion as each contributes mechanical energy to be converted to electrical energy.

As described in U.S. patent application Ser. No. 09/130,500 directed to the rotary actuator, during the time increment succeeding the one depicted in FIGS. 1 and 2, an electrical potential is applied, by means of a controller (not shown), in accordance with standard methods of electrical control, to section 7 and 8 (relative to the counter electrode) in order to induce contraction of the portion of the sheet 1 (or particular element 70) lying between section 7 and 8, while the potential applied to section 5 and 6 is altered such that the portion of film (or element) between section 5 and 6 relaxes. The center crank 2 is thereby caused to rotate along closed path 34 in the direction shown by arrow 21. By continuing the activation and deactivation sequence in a clockwise direction, crank 2 is moved eccentrically about focus 32 in a clockwise direction. When the mechanical work is converted to electricity, analogous motion of crank 2 leading to continued generation occurs. Expansion between section 19 and 20 subsequently leads to sequential expansion in the adjacent elements or portions generating more current to be stored or dissipated. It should be understood that electrical energy is generated both upon expansion and contraction of elements or portions of the conducting polymer.

While the invention has been described in detail, it is to be clearly understood that the same is by way of illustration and example and is not to be taken by way of limitation. Indeed, numerous variations and modifications will be apparent to those skilled in the art. All such variations and modifications are intended to be within the scope of the present invention as defined in the appended claims.

We claim:

1. A method for generating electricity, the method comprising:
   providing
   a conducting polymer having a surface;
   an electrolyte coupled to the surface of the conducting polymer at an interface; and
   a counterelectrode immersed in the electrolyte;
   applying mechanical work to the conducting polymer so as to generate an electrical potential between the conducting polymer and the counterelectrode; and
   coupling the electrical potential to an external circuit,
   wherein the resultant mechanical to electrical energy conversion efficiency is at least 0.01%.

2. A method according to claim 1, wherein the conducting polymer provided is polypyrrole.

3. A method according to claim 2, wherein the electrolyte provided is an aqueous solution of a salt chosen from tetraakylammonium hexafluorophosphate and sodium dodecylbenzene sulfonate.

4. A method according to claim 2, wherein the electrolyte provided is a solution having propylene carbonate as a solvent and containing a salt chosen from tetraalkylammonium hexafluorophosphate and sodium dodecylbenzene sulfonate.

5. A method for braking a mechanical member, the member having kinetic energy, the method comprising:
   providing
   a conducting polymer having a surface;
   an electrolyte coupled to the surface of the conducting polymer at an interface; and
   a counterelectrode immersed in the electrolyte;
   coupling the mechanical member to the conducting polymer such as to apply mechanical work to the conducting polymer;
   generating an electrical potential between the conducting polymer and the counterelectrode; and
   coupling the electrical potential to an external circuit.

6. A method according to claim 5, wherein the resultant mechanical to electrical energy conversion efficiency is at least 0.01%.

7. A method according to claim 5, wherein coupling includes dissipating electrical energy in the external circuit.

8. A method according to claim 5, wherein coupling includes storing electrical energy in the external circuit.

9. A method according to claim 5, wherein the conducting polymer provided is polypyrrole.

10. A method according to claim 9, wherein the electrolyte provided is an aqueous solution of a salt chosen from tetraalkylammonium hexafluorophosphate and sodium dodecylbenzene sulfonate.

11. A method according to claim 9, wherein the electrolyte provided is a solution having propylene carbonate as a solvent and containing a salt chosen from tetraalkylammonium hexafluorophosphate and sodium dodecylbenzene sulfonate.

12. A method according to claim 9, wherein the conducting polymer provided is a sheet.

13. A method according to claim 9, wherein the sheet is essentially circular.

14. A brake for a mechanical member having kinetic energy, the brake comprising:
   a sheet of anisotropic conducting polymer having a specified point and a periphery, the specified point coupled to a crank, the periphery coupled to a stator;
   a coupling assembly for coupling the motion of the mechanical member to the crank; and
   a controller for extracting electrical energy from portions of the sheet in temporal phase,
such that a radius vector directed between the specified point and the center of the crank executes a polar rotation about the specified point.

15. A brake according to claim 14, wherein the sheet is essentially circular.

16. A brake according to claim 14, wherein the electrical energy is generated by sequential contraction and expansion of the portions.

17. A brake according to claim 14, wherein the conducting polymer provided is polypyrrole.

18. A brake according to claim 14, wherein the controller includes an electrolyte.

19. A brake according to claim 18, wherein the controller includes a counterelectrode.

20. A brake for a mechanical member having kinetic energy, the brake comprising:
   at least one conducting polymer member having two ends, a first end coupled to a crank, a second end coupled to a stator;
   a coupling assembly for coupling the motion of the mechanical member to the crank; and
   a controller for extracting electrical energy from the at least one member,
such that a radius vector directed between the first end and the center of the crank executes a polar rotation about a specified point fixed with respect to the stator.

21. A brake according to claim 20, having a plurality of conducting polymer members.

22. A brake according to claim 21, wherein the electrical energy is generated by sequential contraction and expansion of the members.

23. A brake according to claim 21, wherein the conducting polymer members are polypyrrole.

24. A brake according to claim 20, wherein the controller includes an electrolyte.

25. A brake according to claim 24, wherein the controller includes a counterelectrode.

* * * * *